April 28, 1936. I. J. CRONIN 2,038,829
FISHING BAIT
Filed Jan. 14, 1935
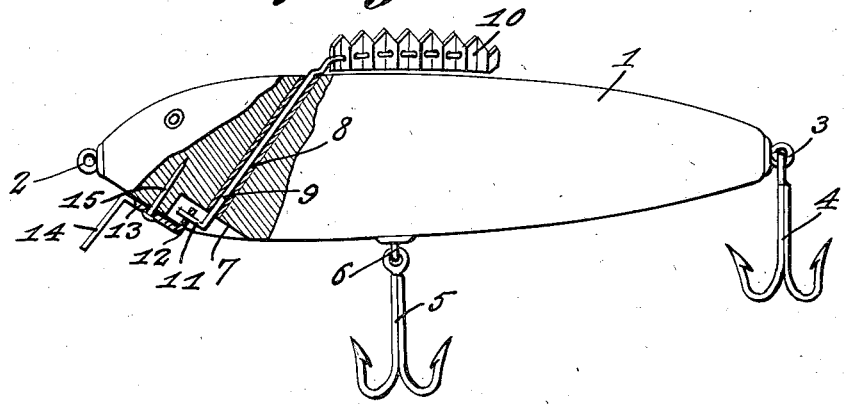
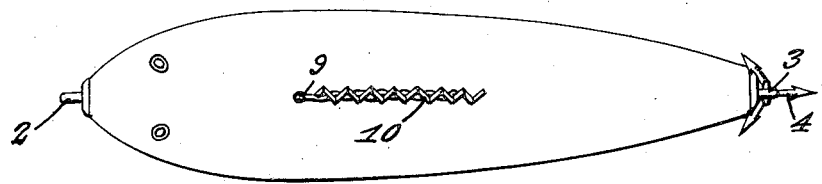
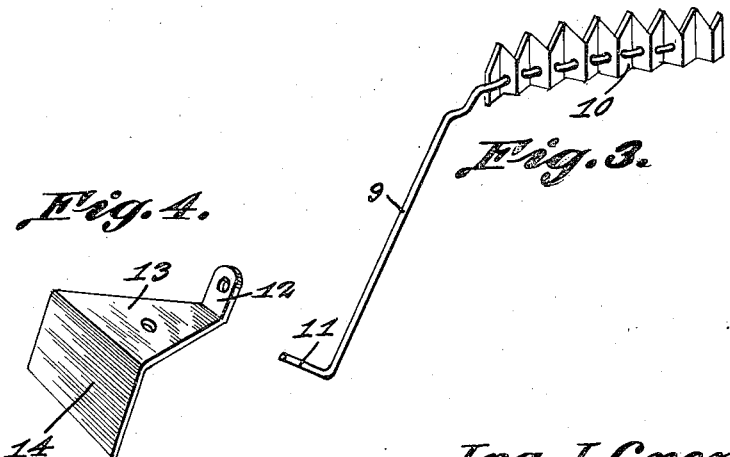
Ira J. Cronin, INVENTOR
BY Victor J. Evans & Co.
ATTORNEY Patented Apr. 28, 1936

2,038,829

UNITED STATES PATENT OFFICE 2,038,829

FISHING BAIT

Ira J. Cronin, Highland Park, Mich.

Application January 14, 1935, Serial No. 1,793

3 Claims. (Cl. 43—46)

This invention relates to artificial bait and its general object is to provide an artificial bait that not only simulates a minnow, but one that is alive, due to movable fin means which is operated by water resistance to simulate natural swimming motion, with the result the bait is very attractive to fish.

A further object of the invention is to provide artificial fish bait of the character set forth, that is simple in construction, inexpensive to manufacture and is extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation of the bait which forms the subject matter of the present invention with parts in section.

Figure 2 is a top plan view.

Figure 3 is a perspective view of the movable fin means.

Figure 4 is a similar view of the water resisting means for actuating the fin means.

Referring to the drawing in detail, the reference numeral 1 indicates the body of my bait which as shown is shaped to simulate a minnow and may be painted or decorated in any well known manner, with means at the forward end of the body to simulate eyes and the body is tapered toward its rear end.

The forward end of the body has secured therein the shank of an eyed member 2 for attaching the bait to a line, while the rear end has secured therein the shank of an eyed member 3 for attaching a group of hooks 4 thereto, and a group of hooks 5 is attached to an eyed member 6 that has its shank extending into the underside of the body as shown in Figure 1.

Arranged in the lower surface of the body adjacent the forward end thereof is a recess 7 to provide a chamber, and extending at an inclination through the body from the recess 7 to the upper surface of the body is an angularly disposed bore which has arranged therein a bearing sleeve 8 for the length thereof. Loosely mounted in the sleeve 8 and extending therethrough is the shank portion 9 of a rod which has its upper end portion attached to a strip 10 which in the form as shown is corrugated and provided with a toothed upper edge to simulate a fin. However, the strip may be flat and the teeth eliminated if desired. In any event, the strip is disposed in close proximity to the upper surface of the body, so as to appear connected to the latter.

The lower end of the rod is bent at right angles upon itself to provide an arm 11 which is mounted in the aperture of an ear 12, the latter being formed on one end of a substantially triangular plate 13 that includes a forwardly directed widened end 14 disposed in the path of the water for a purpose which will be presently apparent.

The plate is loosely pivoted to the underside of the body 1 adjacent to the forward end thereof through the medium of a pin or the like 15 that passes loosely through an opening in the said plate 13, and due to the shape of the forward portion of the body, the plate is positioned on the body 1 so that the ear 12 is arranged in the recess 7, and so that the ear and the arm 11 will be substantially protected against coming in contact with obstructions and the like during the use of the bait, as will be apparent.

From the above description and disclosure of the drawing, it will be obvious that I have provided an artificial bait that will simulate a live minnow and the natural swimming motions thereof, as when the bait is drawn through the water, the resistance of the water set up against the portion 14 of the plate will naturally oscillate the latter and impart a similar oscillating movement to the strip 10, through the instrumentality of the rod and the ear 12.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An artificial bait comprising a body shaped and decorated to simulate a minnow and having a bore extending at an inclination through the forward portion thereof from the upper to the lower surface, a rod extending through said bore, fin means attached to the upper end of said rod and extending longitudinally of the upper surface of the body, means pivoted to the forward end of the body at the lower surface thereof, water resisting means included in the pivoted means and means for connecting the rod to the pivoted means for oscillating the fin means.

2. An artificial bait comprising a body having a bore extending therethrough, a rod loosely mounted in the bore, a strip of material secured to the upper end of said rod and extending longitudinally of the upper surface of the body, said strip being shaped to simulate a fin, a plate pivotally secured to the underside of said body at the forward portion thereof, and including water resisting means to oscillate the plate, and means for connecting the plate to the rod to oscillate the strip through the instrumentality of the rod.

3. An artificial bait comprising a body shaped and decorated to simulate a minnow and having a recess arranged in the forward portion thereof on its underside with the bore extending from the recess to the upper surface of the body at an inclination, a rod loosely mounted in said bore and extending therethrough, a strip secured to the upper end of the rod and extending longitudinally of the body to simulate a fin, an arm formed on the lower end of the rod and arranged in the recess, a plate pivotally secured to the body, an apertured ear formed on the plate and arranged in the recess to receive the arm in the aperture thereof, and a forwardly directed portion included in the plate to set up resistance against the water for oscillating the plate for the purpose of imparting oscillation to the strip through the instrumentality of the rod.

IRA J. CRONIN.